United States Patent
Gordon et al.

(10) Patent No.: US 6,840,375 B2
(45) Date of Patent: Jan. 11, 2005

(54) PORTFOLIO PACKAGING DEVICE FOR DISC-SHAPED ITEMS AND RELATED MATERIALS AND METHOD FOR PACKAGING SUCH DISCS AND MATERIAL

(75) Inventors: Alexandra Gordon, Bedford, NY (US); Charles W. Grimes, Darien, CT (US); William L. Plumb, Piermont, NY (US)

(73) Assignee: Avecmedia Inc., Norwalk, CT (US)

( * ) Notice: Subject to any disclaimer, the term of this patent is extended or adjusted under 35 U.S.C. 154(b) by 85 days.

(21) Appl. No.: 10/219,357

(22) Filed: Aug. 15, 2002

(65) Prior Publication Data

US 2002/0189958 A1 Dec. 19, 2002

Related U.S. Application Data

(60) Continuation-in-part of application No. 09/702,266, filed on Oct. 31, 2000, now Pat. No. 6,533,114, which is a division of application No. 09/161,064, filed on Sep. 25, 1998, now Pat. No. 6,216,857.

(51) Int. Cl.[7] .............................................. B65D 85/57
(52) U.S. Cl. ..................... 206/232; 53/471; 206/308.1; 281/31
(58) Field of Search .................... 53/474, 471; 281/31; 266/217, 232, 303, 307, 308.1, 310, 445, 462, 463; 220/212, 521, 522, 505

(56) References Cited

U.S. PATENT DOCUMENTS

| | | | | |
|---|---|---|---|---|
| 3,000,640 A | * | 9/1961 | Strauss | 369/273 |
| 5,289,917 A | * | 3/1994 | Chabria | 206/232 |
| 5,769,217 A | * | 6/1998 | Derraugh et al. | 206/308.1 |
| 5,816,394 A | * | 10/1998 | O'Brien et al. | 206/308.1 |
| 6,092,650 A | * | 7/2000 | Budnik | 206/232 |
| 6,478,336 B2 | * | 11/2002 | Tran | 281/29 |
| 6,659,271 B2 | * | 12/2003 | Parsons | 206/232 |
| 2002/0050709 A1 | * | 5/2002 | To et al. | 281/29 |
| 2003/0141206 A1 | * | 7/2003 | Innis | 206/308.1 |

* cited by examiner

Primary Examiner—Jim Foster
(74) Attorney, Agent, or Firm—Grimes & Battersby LLP

(57) ABSTRACT

A device for packaging at least one disc-shaped item comprising a storage device for the storage of said disc-shaped media in a chamber or cavity, which storage device may be attached to an object having at least one rigid or semi-rigid planar surface hingedly or removably attached to the remainder of the object, such as a book, folder or box. The chamber includes means for maintaining the disc media in a stable state within the chamber while limiting its linear movement. The storage device is attached to the rigid or semi-rigid planar surface through a hole in said surface, which hole corresponds to the shape of the media-retaining portion of the storage device. The storage device may be retained within the hole by means of a skirt running around the perimeter thereof, which skirt is adapted to engage the back of the rigid or semi-rigid member.

11 Claims, 15 Drawing Sheets

PORTFOLIO PACKAGING DEVICE FOR DISC-SHAPED ITEMS AND RELATED MATERIALS AND METHOD FOR PACKAGING SUCH DISCS AND MATERIAL

RELATED APPLICATIONS

This is a continuation-in-part of U.S. patent application Ser. No. 09/702,266 filed on Oct. 31, 2000 in the names of Alexandra Gordon and Charles W. Grimes for "Packaging Device for Disc-Shaped Items and Related Materials and Method for Packaging Such Disks and Material" now U.S. Pat. No. 6,533,114 which, in turn, was a divisional of U.S. patent application Ser. No. 09/161,064 filed on Sep. 25, 1998 in the names of Alexandra Gordon and Charles W. Grimes for "Packaging Device for Disc-Shaped Items and Related Materials and Method for Packaging Such Disks and Material" which subsequently issued on Apr. 17, 2001 as U.S. Pat. No. 6,216,857.

BACKGROUND OF THE INVENTION

1. Field of the Invention

This invention relates, in general, to a device for packaging and displaying a circular or disc-shaped media and other materials and a method for packaging such disc-shaped media and other materials and, in particular to containers and methods for initially packaging and thereafter repeatedly storing disc-shaped media together with said other materials, wherein said other materials have at least one planar surface, such as a book, folder or box.

Still more particularly, the present invention further relates to a new and improved system and method for initially packaging and thereafter repeated storing of a disc-shaped media including a support element to receive and retain said disc-shaped media together with other materials having at least one planar surface, such as a book, folder or box.

2. Background of the Invention

Packaging and storage devices for media are generally known. Disc-shaped media, such as CD's, DVD's or CD-ROM's, encounter special problems in handling, packaging and storage due to their delicate, flat recorded surfaces. Such disc media is generally sold in plastic cases which are sometimes referred to as "jewel boxes." Such cases are generally rectangular and have a mounting hub for holding the disc media by its center aperture. Such cases are usually kept after purchase of the disc media and utilized for re-packaging, of the disc media between usage. Such jewel boxes are impractical packaging containers for shipping because of their small dimensions and easy breakage, and they thus require substantial additional packaging material or placement in larger shipping containers.

Disc media is routinely sold with other materials (whether directly related to the content of the disc media, i.e., ancillary, or otherwise). At the present time, disc media in such "jewel boxes" is commonly packaged together with ancillary materials in larger rectangular shaped cardboard boxes for shipping, sale and packaging. The "jewel boxes" are necessary to reliably protect the disc media from contact with the ancillary materials in the larger cardboard boxes. Such plastic case/cardboard box combination package arrangements are not only expensive, they also do not lend themselves to easy and secure repeated re-storage of the disc media and ancillary materials. They are often damaged during initial opening and repeated re-storage. They are often unable after initial opening to securely re-store the disc media (in the jewel box) and the other materials together in the cardboard packaging in a manner to preclude contact with each other. They frequently become unsightly after initial opening and repeated re-storage. They are, themselves, difficult to handle and store.

Other types of packaging and storage devices are needed to organize, protect, ship, display at retail and store disc media sold and/or shipped in combination with ancillary materials.

A need also exists for devices which can effectively and efficiently organize, protect, ship, display at retail and store disc shaped media with other materials.

An opportunity exists that is not being commercially exploited at the present time to distribute disc-shaped recording media with materials that are either ancillary or wholly unrelated to the content of the disc media. This opportunity is not being exploited due to the lack of an effective container design and method for efficiently organizing, protecting, shipping, displaying at retail and storing disc-shaped media packaged with other materials.

SUMMARY OF THE INVENTION

It is a primary object of the present invention to provide a container in which and a method whereby disc-shaped media can initially be packaged together with other materials having at least one substantially planar surface such as a book, folder or box.

Another object of the present invention is to provide a container and method of packaging whereby, after the disc-shaped media has been removed it can easily be re-attached to said other material.

Yet another object of the present invention is to provide a container and method of packaging whereby there is no contact between the disc-shaped media and the other materials.

Still another object of this invention is to provide a container and a method of packaging that eliminates the need for a separate case (i.e., the need for a "jewel box") for the disc media.

Another object of this invention is to provide a container and a method of packaging whereby during initial storage, shipping, retail presentation and re-packaging disc media is securely held against movement and protected.

Yet another object of this invention is to provide a shipping container in which and a method of shipping whereby disc-shaped media and other materials can be packaged, presented, conveyed, distributed and stored.

Still another important object of this invention is to provide an aesthetically unique and compelling device and method for presenting at retail disc-shaped media and other materials which may or may not be related to the content of the media.

Another object of this invention is to provide a container and a method of packaging whereby the disc-shaped media is prevented from moving linearly either in the plane of or perpendicular to the plane of the disc-shaped media.

Yet another object of this invention is to provide a container and a method of packaging whereby the disc-shaped media is allowed to rotate freely.

To accomplish these and other objects, the container of this invention in its preferred form comprises a storage device for the storage of disc-shaped media in a chamber or cavity, which storage device may be attached to an object other than the disc-shaped media, said object being of the type having at least one rigid or semi-rigid planar surface that is either hingedly attached or removably attached to the remainder of the object, such as a book, folder or box. The chamber includes means for maintaining the disc media in a stable, albeit rotatably enabled, state within the chamber, i.e., limiting the linear movement of the disc media both perpendicular to and parallel to the plane of the media. A separate cylindrical structure may be provided for the purpose of engaging the central aperture of the disc-shaped media may be attached, which structure may further include at least one projection thereon, said projection being adapted to retain the disc-shaped media on the structure. In the preferred embodiment, the storage device is attached to the rigid or semi-rigid surface of the other materials through an opening in said surface, which opening is dimensioned in terms of size and shape relative to the size and shape of the media-retaining portion of the storage device. The storage device may be retained within the opening of the surface by a variety of means, but in the preferred embodiment, the storage device includes a skirt running around the perimeter thereof, which skirt is adapted to engage the back of the rigid or semi-rigid surface about the periphery of said opening. An adhesive such as fugitive glue may further be used to secure the storage device in place.

In the preferred method of packaging, disc media is inserted into and releasably retained within the chamber of the storage device, which storage device is then slidably inserted through a opening in a rigid or semi-rigid surface of an object having at least one planar surface, such as a book, folder or box.

The above, as well as additional objects, features and advantages of the invention will become apparent in the following detailed description.

BRIEF DESCRIPTION ON THE DRAWINGS

The novel features believed characteristics of the invention are set forth in the appended claims. The invention itself, however, as well as the preferred mode of use, further objects and advantages thereof, will best be understood by reference to the following detailed description of illustrative embodiment when read in conjunction with the accompanying drawings, wherein:

Figure 14:
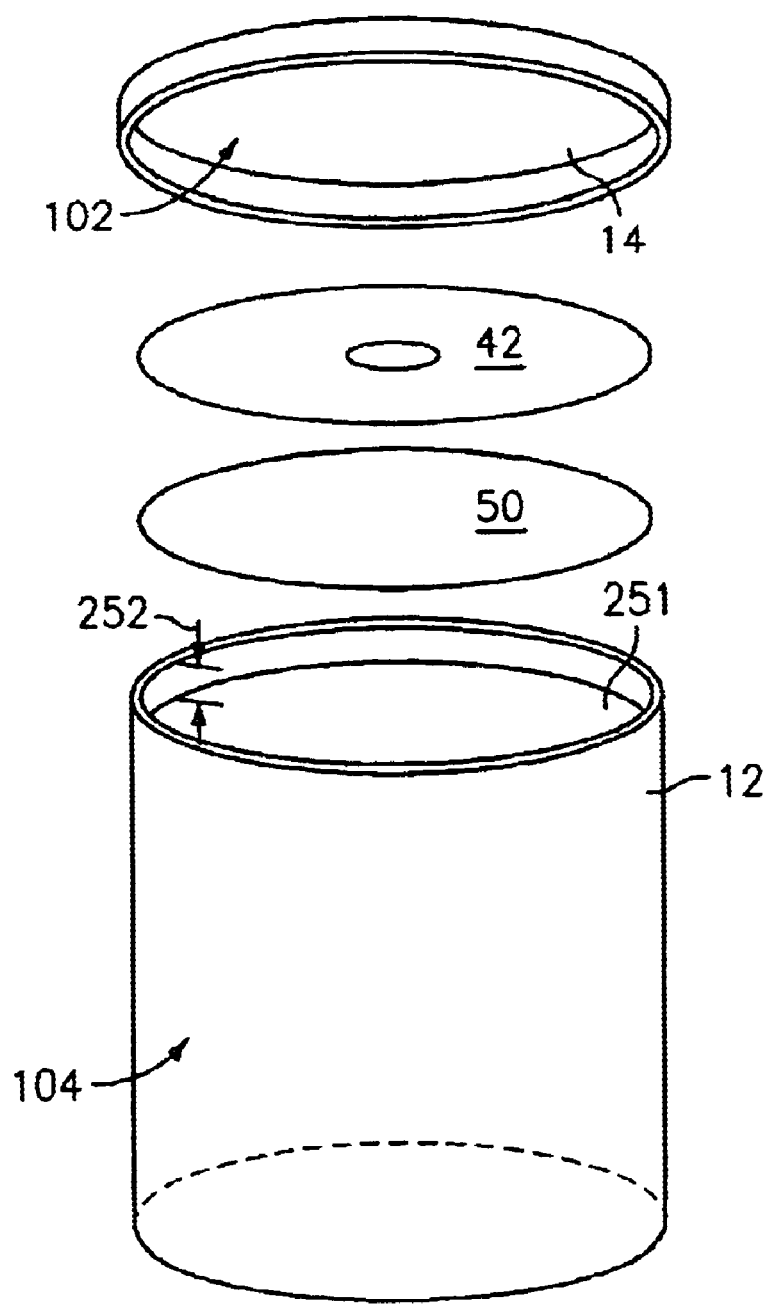
Figure 15:
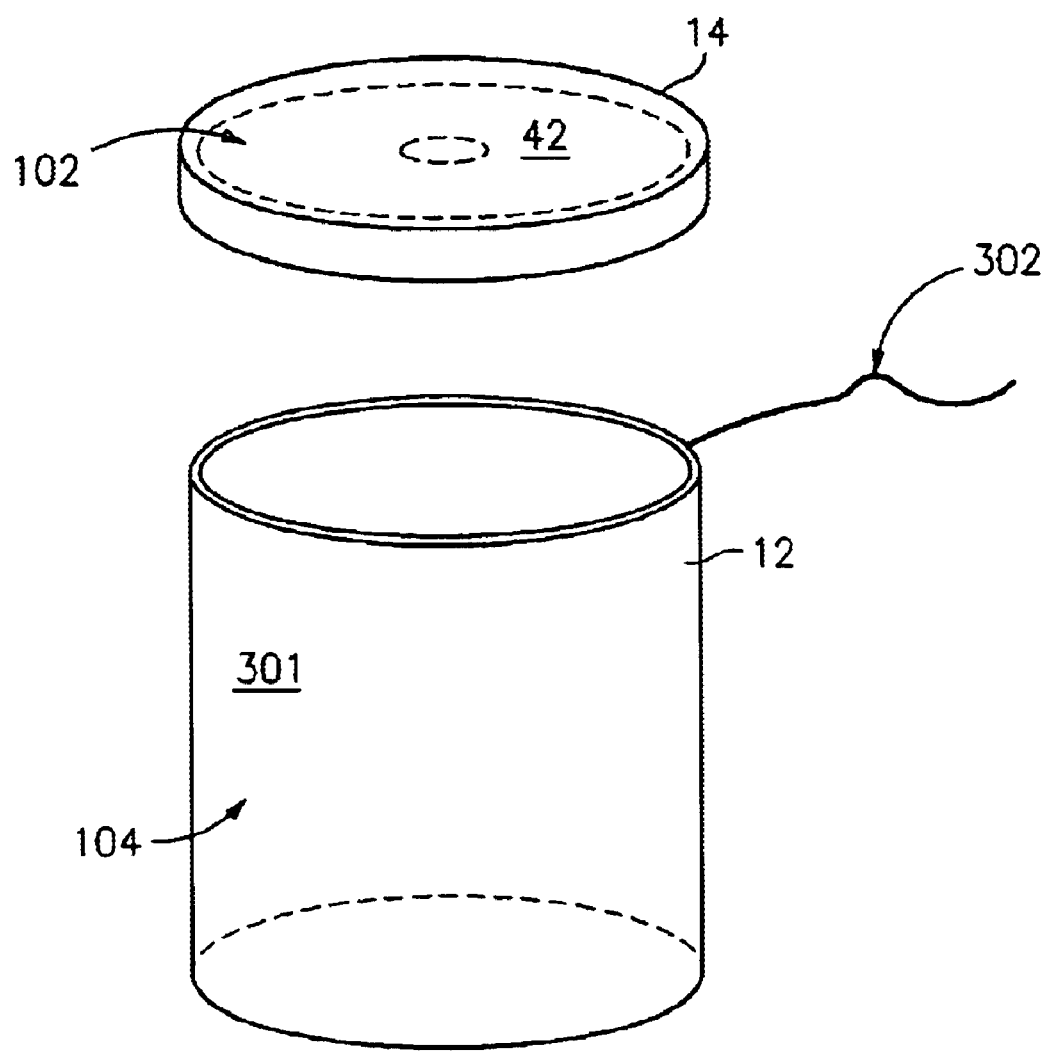

FIG. 14 is an exploded perspective view of a further alternative embodiment of the novel disc packaging device of the present invention with the lid, disk media and protective element removed, illustrating the use of a sealed base; and FIG. 15 is an exploded perspective view of a further alternative embodiment of the novel disc packaging device of the present invention in which the disk media is sealed within the lid, and the base is separately sealed, and the lid and base are detachably joined together by an outer packaging skin that can be severed with a pull string.

Figure 16:
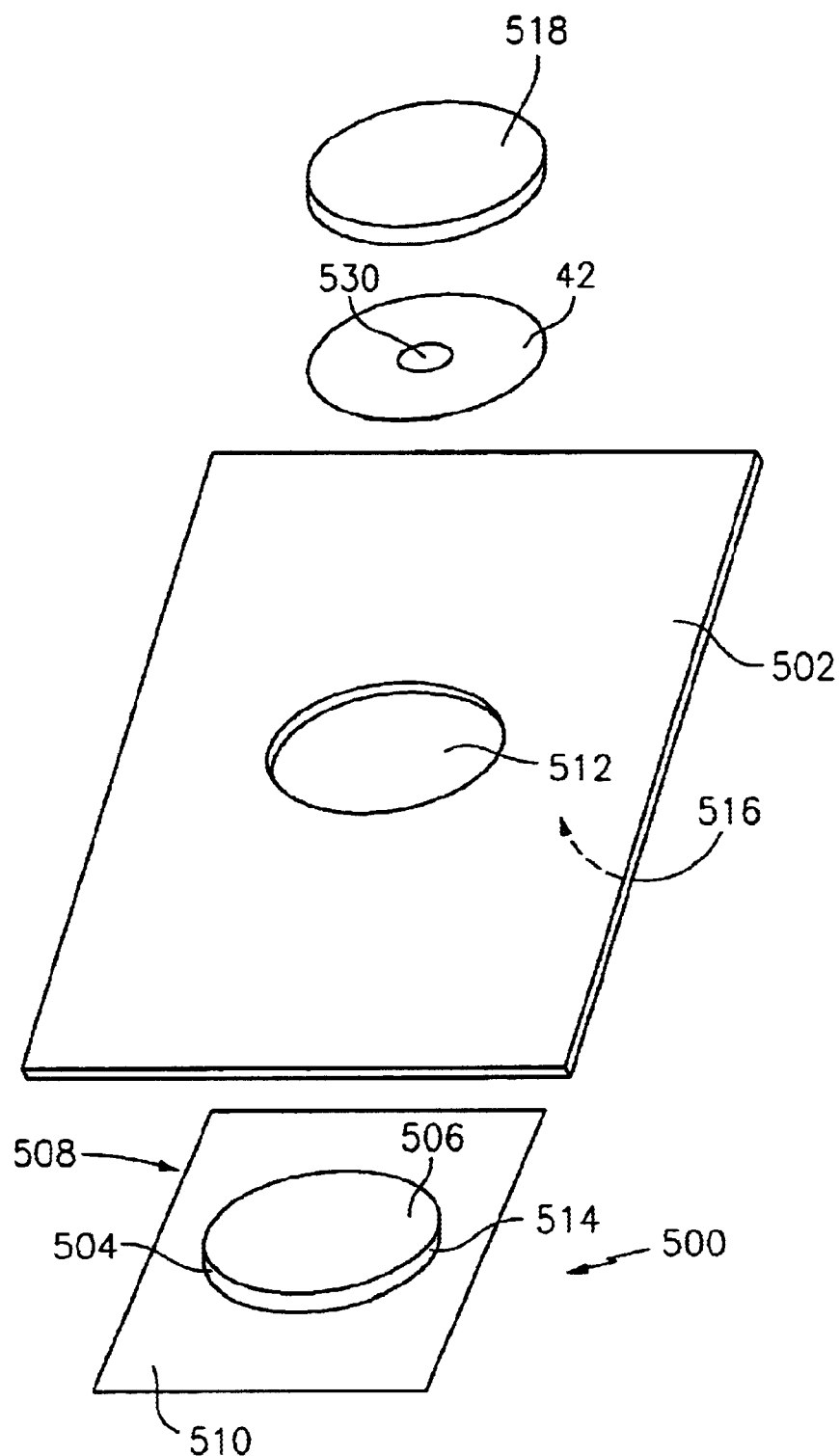

FIG. 16 is an exploded perspective view of a further alternative embodiment of the novel disc packaging device of the present invention in which the storage device is attached to an object having at least one rigid or semi-rigid planar surface such as a book, folder or box.

Figure 17:
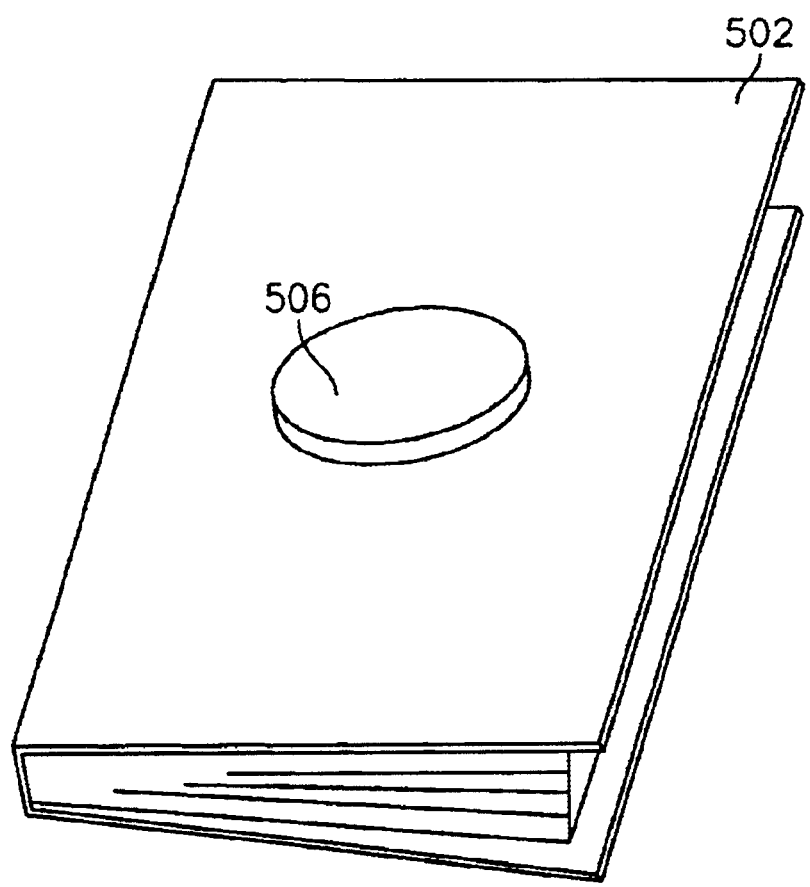

FIG. 17 is a perspective view of the embodiment of FIG. 16 in which the disc-shaped media is attached to the object.

Figure 18:
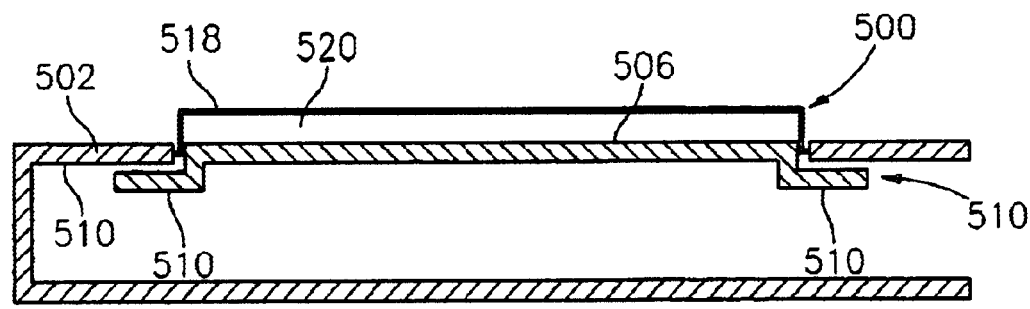

FIG. 18 is a cut-away, cross-sectional view of the fully assembled embodiment of FIG. 16.

Figure 19:
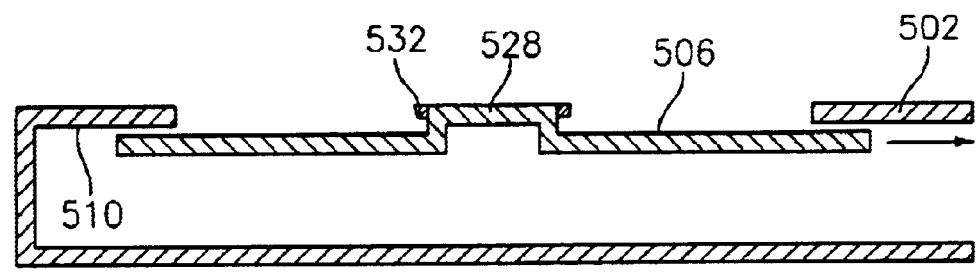

FIG. 19 is a cut-away, cross-sectional view of an alternative embodiment of the embodiment of FIG. 16 in which the disc-shaped media is retained upon a cylindrical support structure in lieu of a cover.

Figure 20:
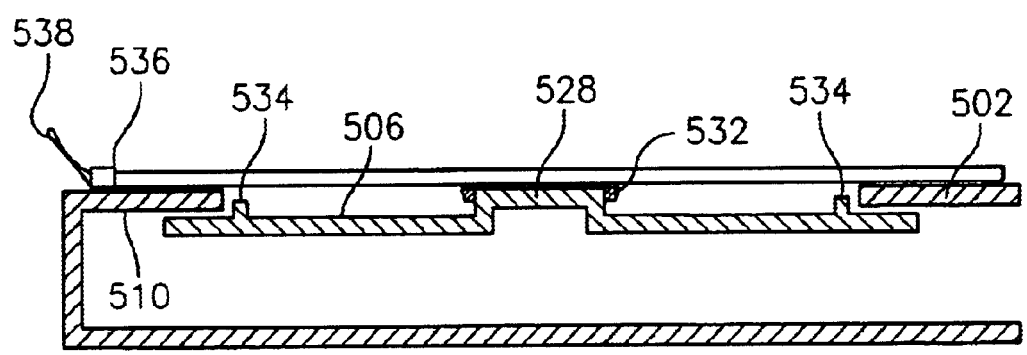

FIG. 20 is a cut-away, cross-sectional view of the alternative embodiment of FIG. 19 in which positioning elements are provided and an optional seal is applied in lieu of a cover.

Figure 21:
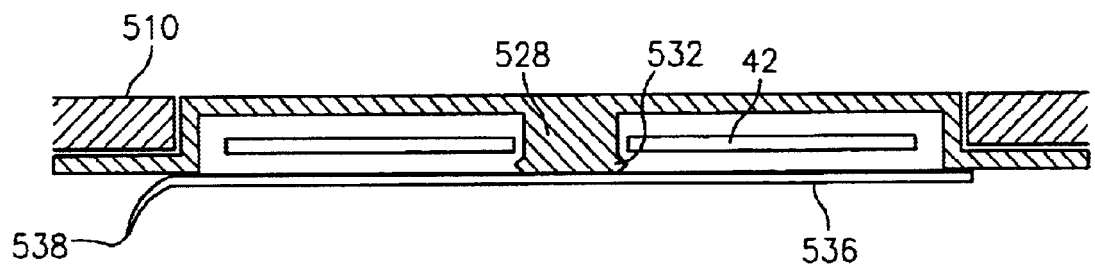

FIG. 21 is a cut-away, cross-sectional view of another alternative embodiment of FIG. 19 in which positioning elements are provided on the exterior surface of the storage device.

Figure 22:
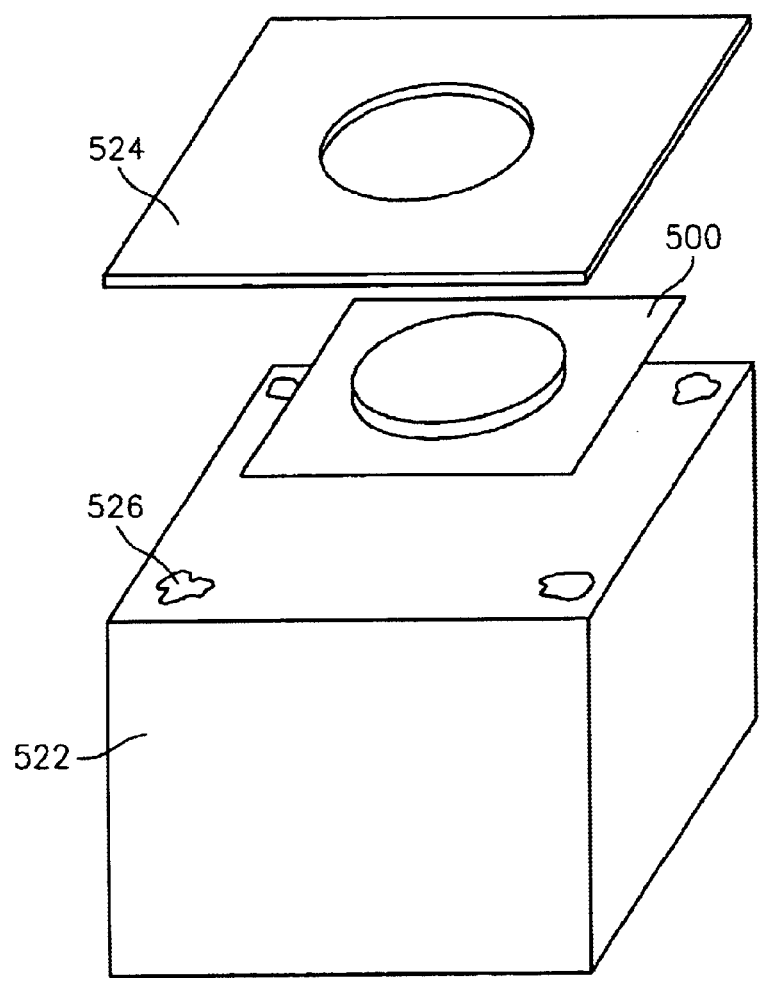

FIG. 22 is a perspective view of another alternative embodiment of the embodiment of FIG. 16 in which the other object is a box.

DETAILED DESCRIPTION OF THE INVENTION

Figure 1:
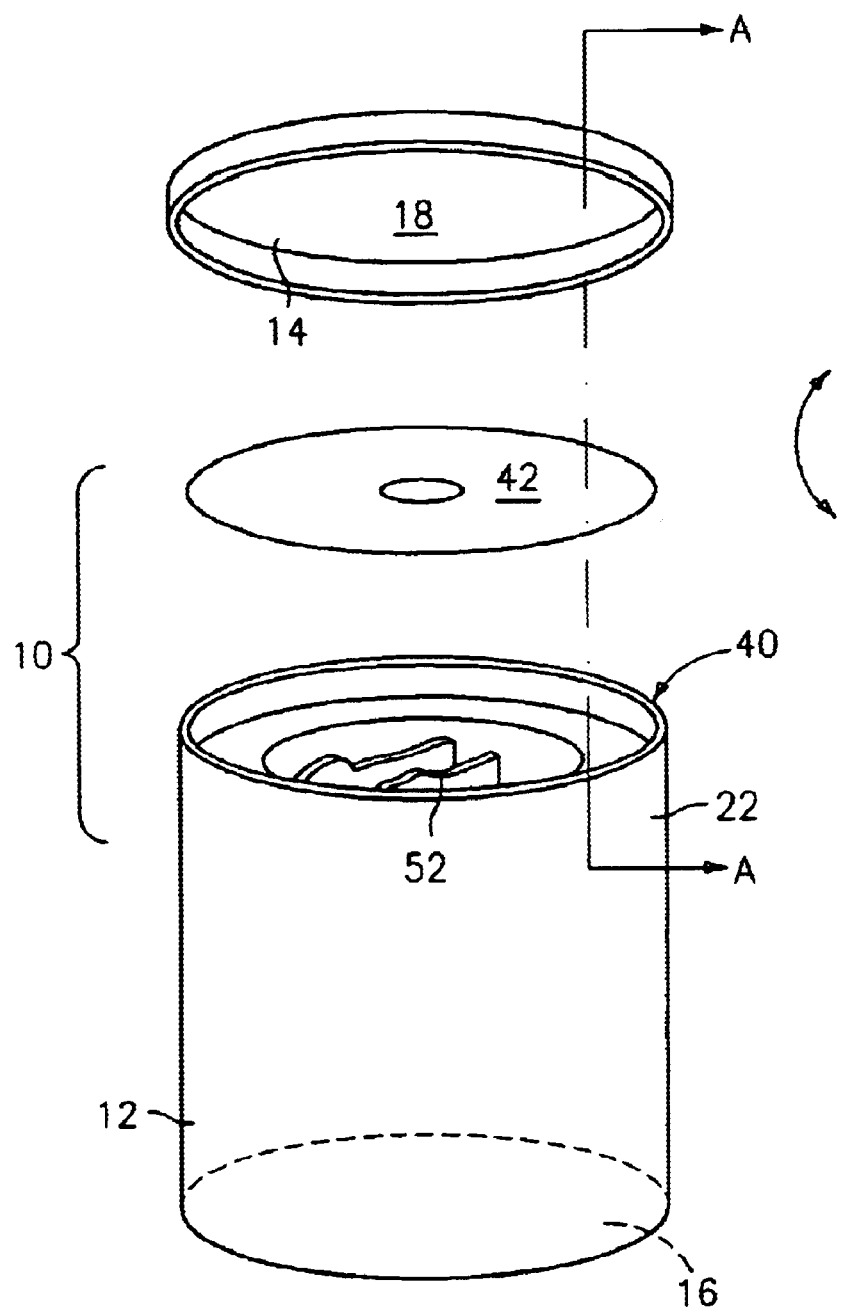
FIG. 1 is an exploded perspective view of the novel disc packaging device of the present invention with the lid and disk media removed, illustrating the use of a one-piece annular collar member with an annular ring and lip.

With reference now to the figures and in particular with reference to FIG. 1, there is shown a front view of the disc packaging device 10 of the present invention. As illustrated, disc packaging device 10 includes a lower base component or container 12 and an upper cover component or lid 14. Lower base component 12 and upper cover component 14 are utilized to form a generally cylindrical packaging device of dimension slightly larger than the disc shaped recording media to be stored. End plates 16 and 18 cooperate with lower base component 12 and upper cover component 14 to fully enclose the cylindrical packaging space defined thereby.

Figure 2:
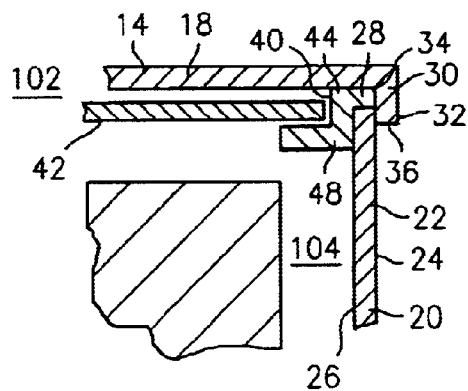
FIG. 2 is a cut-away, cross-sectional side view of a portion of the novel disc packaging device of FIG. 1 when the lid is on the container, along line AA illustrating the resultant first and second chambers thereof.

The lower base component 12 of the embodiment of this invention shown in FIGS. 1 and 2 includes a side wall 20. The side wall can be constructed from either cardboard (i.e., natural fiber material) or plastic (i.e., man-made synthetic material) or other material suitably rigid for the base component to retain its shape, including metal, e.g., as in a vacuum sealed, canned product.

The base component 12 can be designed to threadably receive the bottom plate 16 which is of conventional design, made of stiff cardboard, plastic, metal or some similarly rigid material and used as a cover-all screw cap on a very wide variety of containers. Alternatively the bottom plate 16 can nest inside the side wall 20 where it is held by friction, stapling, gluing or some other means. The side wall 20 has an upper section 22 and the upper section 22 can be threaded to accommodate the upper cover component 14 although in the embodiment shown in FIGS. 1 and 2 the cover is made of plastic and snaps on in a conventional manner.

As best seen in FIG. 2, the upper section 22 is defined by an outer wall 24, an inner wall 26 and a rim 28. The cover component 14 has a side wall 30 defined by an outer wall 32, an inner wall 34 and a rim 36. The diameter of the inner wall 34 of the cover component is slightly greater than the diameter of the outer wall 24 of the base component. In the embodiment shown in FIGS. 1 and 2, there is an inner structure 40 which provides circumferential support for a disc shaped media 42 stored within the packaging device 10. The structure 40 comprises an annular collar 44 having an annular ring 46 and an annular lip 48. The inner structure 40 nests within the lower base component 12. The annular collar 44 has an outer diameter greater than the diameter of the inner wall 26 of the base component such that the annular collar extends beyond the inner wall 26 and sits on top of the base rim 28. The annular ring 46 has an outer diameter less than the diameter of the inner wall 26, such that the annular ring nests inside the inner wall 26. The annular lip 48 has an inner diameter less than the outer diameter of the disc shaped media 42. Thus, the disc shaped media will rest on the annular lip, inside the annular ring. In this way, movement of the disc shaped media in the plane of the disc shaped media is precluded by the annular abutment 46. Movement of the disc shaped media perpendicular to its plane is prevented in one direction by the annular lip 48. When the cover component 14 is affixed to the base component 12, the cover plate 18 acts to preclude movement of the disc shaped media in the opposite perpendicular direction to the plane of the disc shaped media.

Figure 2A:
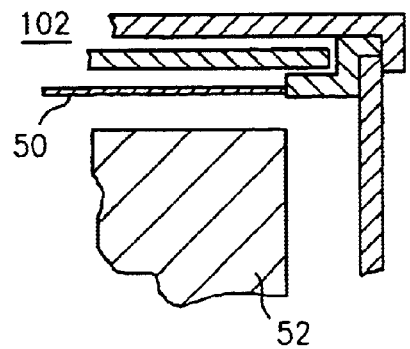
FIG. 2A is an alternative embodiment of the device shown in FIG. 2, wherein a protective element is inserted between the first and second chambers.

In the embodiment disclosed in FIG. 2A, a protective member 50 is attached to the annular lip 48. The protective member can be made of plastic film or any other conventional material to provide a barrier between the disc shaped media and other materials 52 which can be stored in the base component 12 of the packaging device 10. The protective member can be permanently affixed to the annular lip or it can be affixed at the time of assembly and shipment and removed by the consumer after purchase, i.e., at a time when further "rough handling" that would cause interaction between the disc shaped media and the other materials is less likely to occur.

Figure 2B:
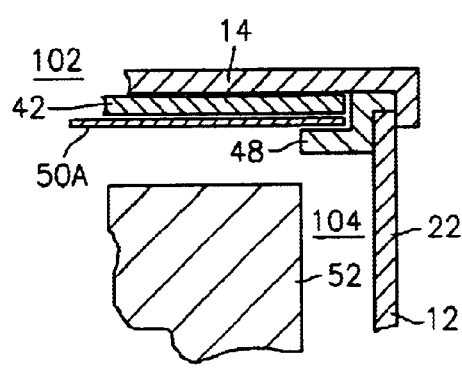
FIG. 2B is an alternative embodiment of the device shown in FIG. 2A, showing an alternative method of insertion of the protective element between the first and second chambers.

In an alternative embodiment disclosed in FIG. 2B, the protective element is removable and sized to seat on the annular lip 48 between the annular lip 48 and the disc shaped media. The protective element is round like the disc shaped media and has a central opening into which one's finger can be inserted to engage, lift and remove the protective element and subsequently engage, lift and replace the protective element.

Figure 2C:
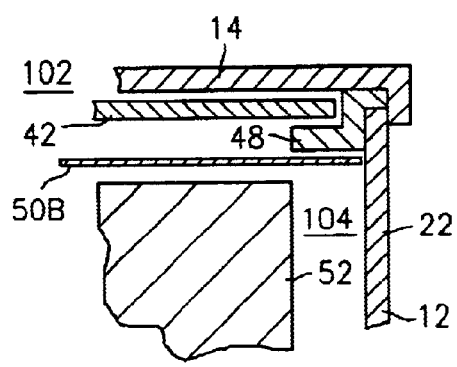
FIG. 2C is a further alternative embodiment of the device shown in FIG. 2A, showing, a further alternative method of insertion of the protective element between the first and second chambers.

In an alternative embodiment disclosed in FIG. 2C, the protective element 50B is flexible and is removably inserted within the lower base component beneath the annular lip 48 and on top of the other materials 52 placed therein. The protective element is sized to correspond to the interior wall 26 and has a central opening into which one's finger can be inserted to engage, lift and remove the protective element and subsequently engage, lift and replace the protective element. Alternatively, the protective element can be provided with a lift tab or some other conventional means whereby it can be grabbed and removed.

Figure 3:
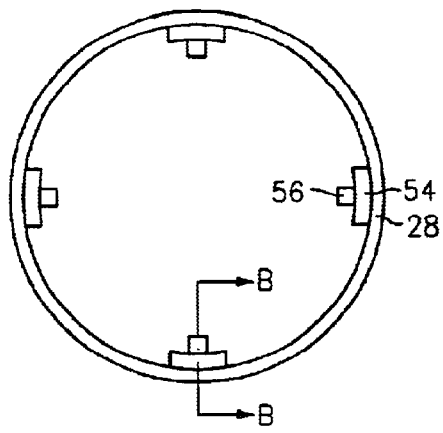
FIG. 3 is a top plan view of the novel disc packaging device of the present invention illustrating the alternative use of abutments and protrusions affixed to the inside wall of the container.
Figure 3A:
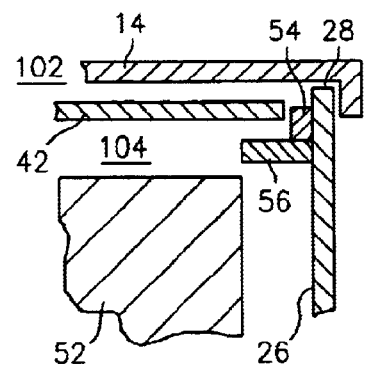
FIG. 3A is a cut-away, cross-sectional side view of a portion of the device shown in FIG. 3, along line B—B, with a disc media and other materials inserted and the lid affixed.

In the alternative embodiment shown in FIGS. 3 and 3A, the inner structure 40 is modified. The annular collar 44 with annular ring 46 and annular lip 48 is replaced by discrete abutments 54 and discrete protrusions 56. Collectively, the abutments 54 and protrusions 56 are positioned within the lower base component 12 around the circumference of the inner wall 26 spaced below the rim 28, affixed to the inner wall 26, so as to perform the same function as the annular ring 46 and annular lip 48. Specifically, the abutments 54 preclude movement of the disc shaped media in the plane of the disc shaped media i.e., performing the same function as the annular ring 46. Similarly, the protrusions 56 are positioned about the inner wall 26 and collectively preclude movement of the disc shaped media in a direction perpendicular to plane of the disc shaped media i.e., performing the same function as the annular lip 48.

Figure 3B:
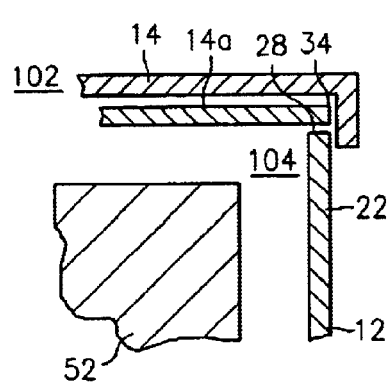
FIG. 3B is a cut-away, cross-sectional side view of an alternative embodiment of the novel disc packaging device of the present invention illustrating the alternative use of the upstanding rim of the base and the inside wall of the cover in place of the abutments and protrusions of FIG. 3.

FIG. 3B shows a further alternative embodiment wherein the disc shaped media is seated on the rim 28 and movement of the disc shaped media perpendicular to its plane is prevented in one direction by the rim 28. When the cover 14 is affixed to the base component 12, movement of the disc shaped media in the plane of the disc shaped media is precluded by the inner wall 34 of the cover 14 and inner surface 14a of the cover 14 acts to preclude movement of the disc shaped media in the second, opposite perpendicular direction to the plane of the disc shaped media.

Figure 3C:
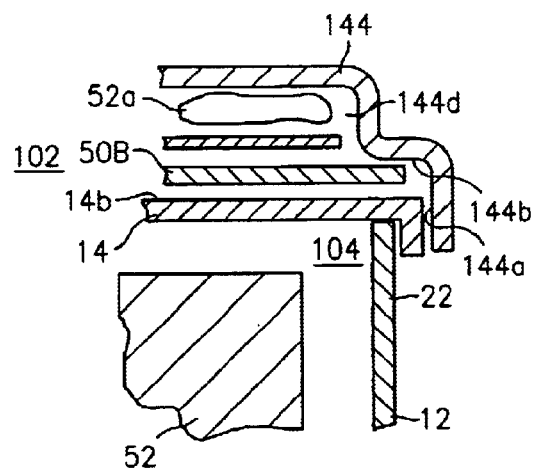
FIG. 3C is a cut-away, cross-sectional side view of an alternative embodiment of the novel disc packaging device of the present invention illustrating the alternative use of the outer surface of the cover and the inner surface of a supplementary cover in place of the abutments and protrusions of FIG. 3.

FIG. 3C shows a further alternative embodiment wherein the disc shaped media is seated on the outside surface 14b of the cover 14 and movement of the disc shaped media perpendicular to its plane is prevented in one direction by a supplementary cover 144 that snaps onto the cover 14. When the supplementary cover 144 is affixed to the cover 14, movement of the disc shaped media in the plane of the disc shaped media is precluded by the inner wall 144a of the supplementary cover 144 and the inner wall 144b of the supplementary cover 144 acts to preclude movement of the disc shaped media in the second, opposite perpendicular direction to the plane of the disc shaped media. The supplementary cover 144 can include a chamber 144d and a protective element 50b can be inserted to prevent contact between the disc shaped media and whatever materials 52a are placed in the chamber 144d.

Figure 4:
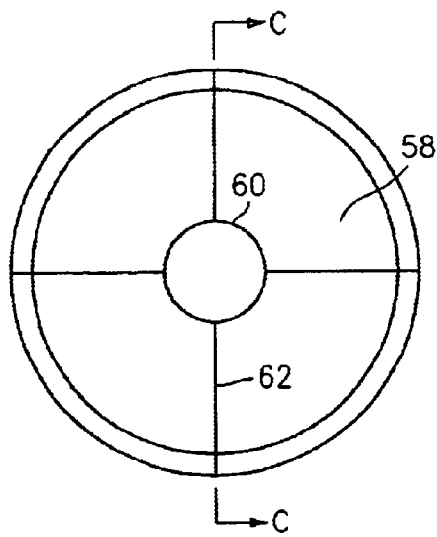
FIG. 4 is a top plan view of the novel disc packaging device of the present invention illustrating the alternative use of a center annular post support for the disc media PORTFOLIO from spokes.
Figure 4A:
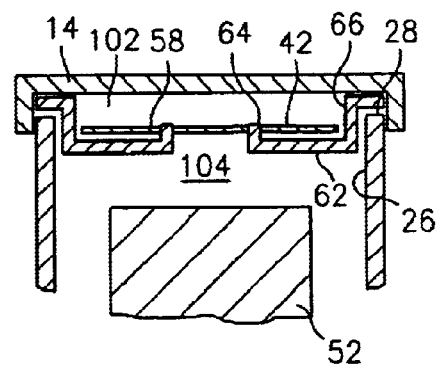
FIG. 4A is a cut-away, cross-sectional side view of the device shown in FIG, 4, along line C—C, with a disc media and other materials inserted and the lid affixed.

In the alternative embodiment seen in FIGS. 4 and 4A, the inner support structure 40 is replaced with an inner support structure 58 that provides center support for the disc shaped media as opposed to the circumferential support provided by inner structure 40. In the embodiment shown in FIGS. 4 and 4A, the alternative inner structure 58 includes an annular ring 60 and spokes 62 extending therefrom. As seen in FIG. 4A, the annular ring 60 has a raised portion 64 on which the disc media 42 sits, The spokes 62 each have a finger portion 66 which extends upwardly and outwardly such that when the structure 58 is inserted into the base component 12, the fingers 56 frictionally engage the inner wall 26 and sit on the upper rim 28. The structure 58 can include webbing between the fencers 56 (ala the webbing in a duck's foot) comprised of a thin material to provide protection for the disc shaped media 42 from the other materials 52. Inside the annular ring 60 would be left open to allow the consumer, after removing, the cover 14, to insert their finger into the annular ring and to thereby remove both the disc shaped media 42 and the structure 58.

Figure 5:
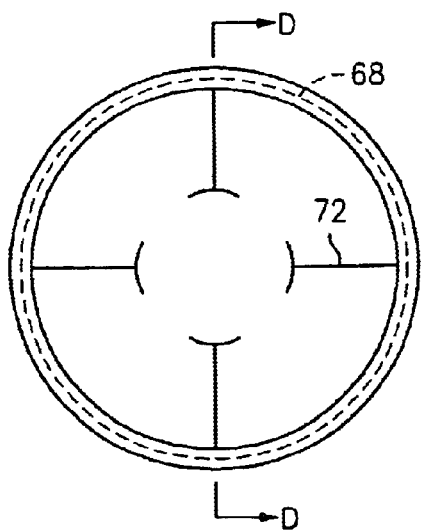
FIG. 5 is a top plan view of the novel disc packaging device of the present invention illustrating fingers that extend from a frame carried by the side wall of the container and that provide center support for the disc media.
Figure 5A:
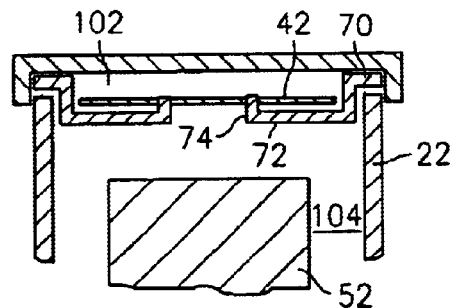
FIG. 5A is a cut-away, cross-sectional side view of the device shown in FIG. 5, alone, line D—D, with a disc media and other materials inserted and the lid affixed.

FIGS. 5 and 5A show a further alternative inner structure 68 comprising an annular collar 70 from which fingers 72 extend inwardly. At the ends of the fingers 72 are upstanding projections 74. The annular collar 70 nests inside the inner wall 26 and sits on the rim 28 in the same manner as the inner structure 40 in the embodiment shown in FIGS. 1 and 2. The upstanding projections 74 cooperate to provide a center support structure for the disc shaped media.

Figure 6A:
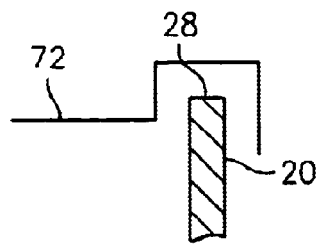
FIGS. 6A and 6B are cross-sectional views of alternate embodiments of the packaging device of the present invention depicting two different methods of mounting the disc media support member to the device outer wall.
Figure 6B:
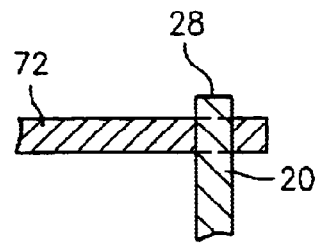

As seen in FIGS. 6A and 6B, the fingers 72 in the embodiment shown in FIGS. 5 and 5A do not necessarily need to be PORTFOLIO from an annular collar. Alternatively, the could be clipped to the side wall 20 as seen in FIG. 6A or they could be screwed into the side wall 20 as shown in FIG. 6B.

Figure 7:
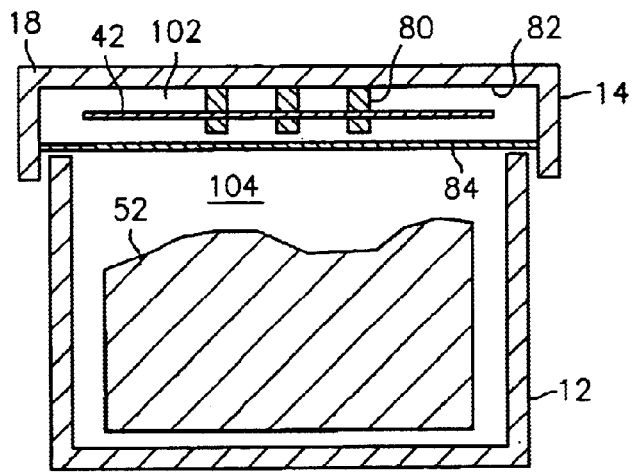
FIG. 7 is a cut-away, cross-sectional side view of an alternative embodiment of the present invention with disc media and other materials inserted, the protective element inserted and the lid closed, in which the first chamber in which the disc media is stored is in the cover.

In an alternative embodiment shown in FIG. 7, a center support structure is provided for the disc shaped media in the upper cover component 14. Specifically, projections 80 extend from the inside wall 82 of the end plate 18. These projections 80 cooperate to provide secure support for the disc shaped media in the cover component 14. A protective element 84 can be provided which is either removably nested within the cover as shown or which can be inserted at the time of manufacture and removed and discarded by the consumer after purchase. The cover 14 can engage the base component 12 in any variety Of conventional ways, e.g., snap on, telescope on, screw on, etc.

Figure 7A:
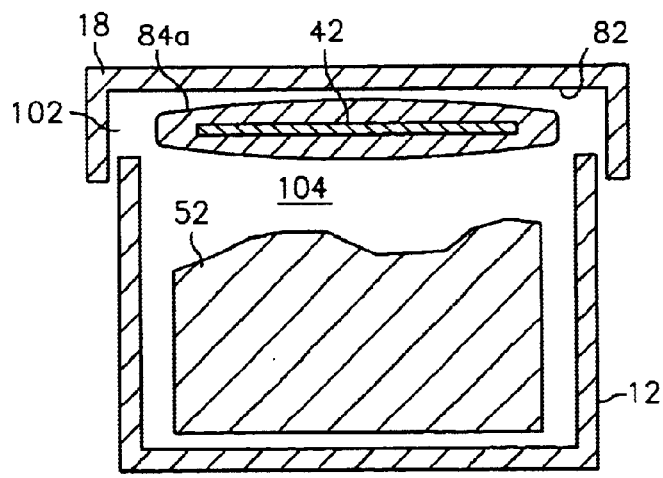
FIG. 7A is a cut-away, cross-sectional side view of an alternative embodiment of the device shown in FIG. 7, wherein the disc media is inserted into a protective envelope that is affixed to the inner surface of the cover.

In a further alternative embodiment shown in FIG. 7A, the disc shaped media is encased within an envelope 84a made of plastic or some other suitable material and which is affixed to the inside wall 82 of the end plate 18. The envelope is either removably or permanently affixed, e.g., by gluing, with double-sided tape, or by other conventional means. The envelope can itself constitute a re-useable packaging container for the disc shaped media that either remains affixed to the plate 18 or can be removed from the plate 18, e.g., so that the cover 14 can be discarded. Or the disc shaped media can be packaged within a packaging sleeve (not shown) ail of which can then be inserted into the envelope and then removed from the envelope once the envelope is opened.

Figure 8:
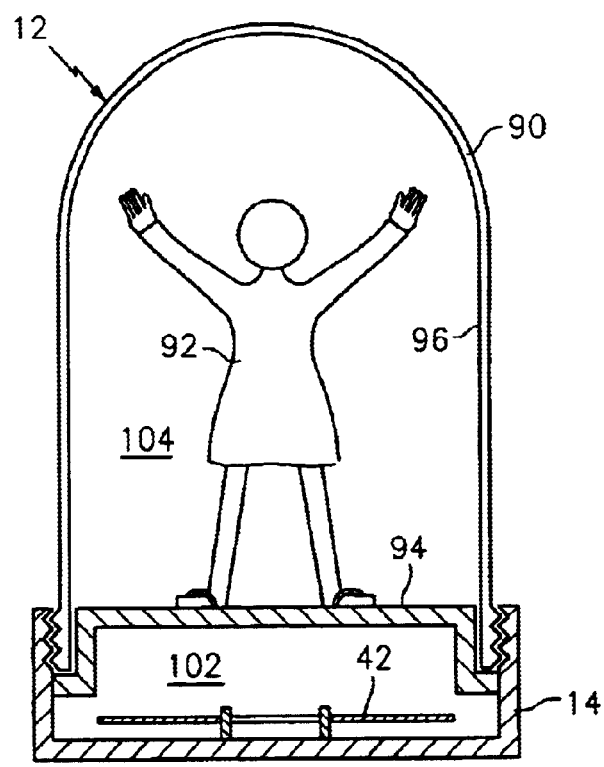
FIGS. 8 and 8A are side perspective, partially cut-away, cross-sectional views of alternative embodiments of the present invention, illustrating the use of the "lid" of the embodiment shown in FIG. 7 as the base, thereby allowing the portion of the invention defining the second chamber to be of an irregular shape (FIG. 8) or to have deformable construction (FIG. 8A)
Figure 8A:
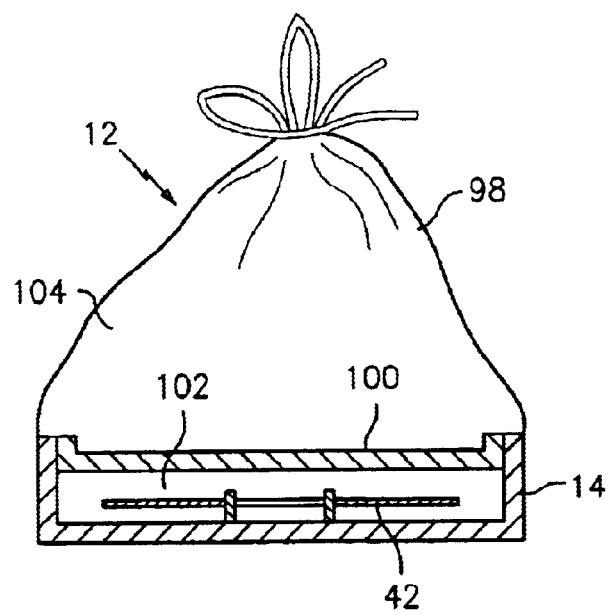

FIGS. 8 and 8A show further alternative embodiments of the present invention. In FIG. 8, the fact that the disc shaped media is stored within the cover component 14 allows for an alternative construction of the container 12. In this alternative embodiment, the cover 14 serves as the "base". The alternative base 90, in which the other materials, in this case, a doll 92, are stored, has an end wall structure 94 which frictionally encases the inner wall 96 and seals the chamber in the base 90. Alternatively, wall 94 can be provided with threads so that it will threadably engage corresponding threads on the inside wall 96. The cover 14 and base 90 can be attached in the same manner as heretofore been discussed in connection with other embodiments.

In the embodiment showing in FIG. 8A, the cover 14 once again carries the disc shaped media 42 and thereby allows the base 12 to be of a deformable construction 98. The deformable member 98 has a rigid internal support structure 100 which is designed to frictionally or threadably engage the cover 14.

Figure 9:
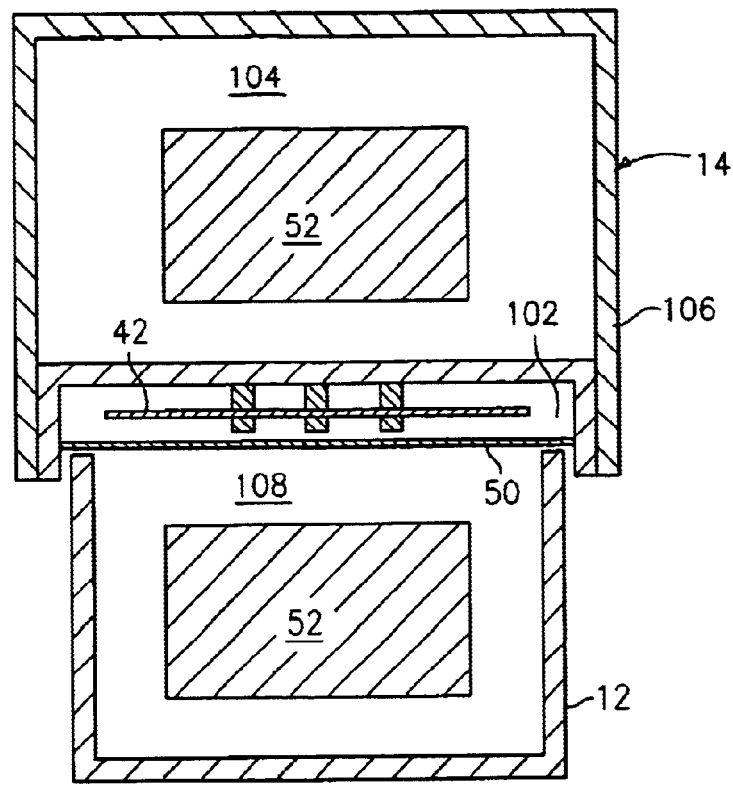
FIG. 9 is a cut-away, cross-sectional side view of an alternative embodiment of the present invention in which the disk media is located in the lid and the lid and the container include second and third chambers, respectively, for storing other material.
Figure 10:
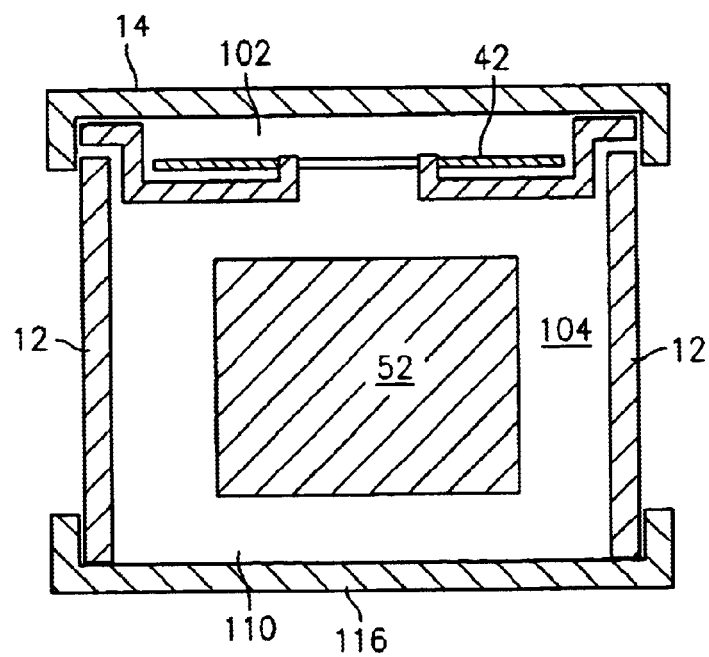
FIG. 10 is a cut-away, cross-sectional view of another embodiment of the present invention in which the second chamber in the container for storing other materials includes a second opening separate and distinct from the lid and a removable cover such that access to the second chamber can be attained without removing the lid.

In the alternate embodiment shown In FIG. 9, the disc shaped media is stored in a first chamber 102 in the lid 14 defined by an annular support 40 similar in construction to the embodiment of FIG. 7, except that the lid includes a second chamber 104 defined by an outer wall 106 for other materials and the base 12 includes a third chamber 108. In the alternate embodiment shown in FIG. 10, which is similar in construction to the embodiment of FIG. 4, there is provided an additional opening 110 in the container 22 and a cover 116 for closing the opening 110. The cover 116 can be removed to gain access to the chamber 104 without removing the cover 14.

Figure 11:
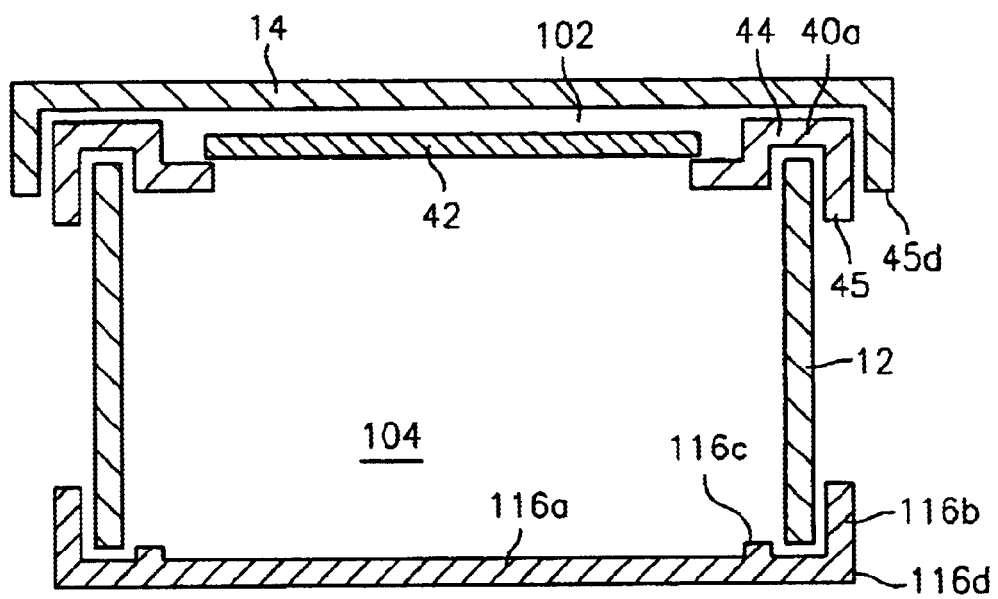
FIGS. 11 and 11A are cut-away, cross-sectional side views of another embodiment of the device shown in FIG. 10 in which the method of mounting shown in FIG. 6A is utilized and wherein the removable cover for the second chamber can be mated with the removable cover for the first chamber to form a mini-packaging device shown in FIG. 11A.
Figure 11A:
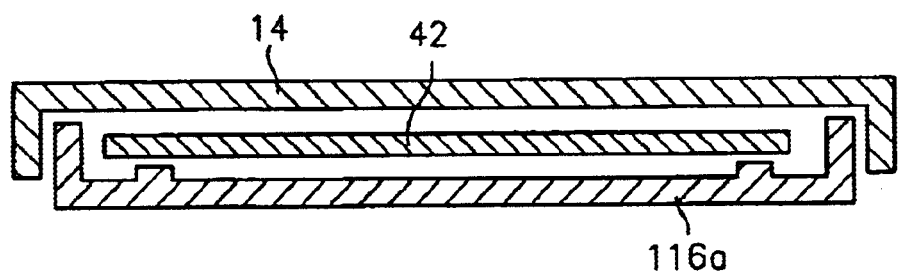

In the alternative embodiment shown in FIGS. 11 and 11A, an inner structure 40a is provided that is a slightly modified version of the inner structure 40 shown in FIG. 2, in that it includes an annular wall 45 that extends around the entire circumference of the annular collar 44 and engages the outer surface of the wall of the base 12, and the cover 14 is configured to engage not the base 12, but rather, the annular wall 45. An additional opening 110 is provided as in the embodiment of FIG. 10, and a cover 116a is provided that is a slightly modified version of the cover 116 of FIG. 10, in that it includes not only an outer annular wall 116b for engaging the outer surface of the wall of the base 12, but also an inner annular wall 116c for engaging the inner surface of the wall of the base 12. The circumferential dimension of the outer surface 116d of the wall 116b of the cover 116a is identical to the circumferential dimension of the outer surface 45d of the wall 45, such that the covers 14 and 116a can be removed and the cover 14 which matingly engaged the wall 45 will matingly engage the outer wall 116b of the cover 116a, as shown in FIG. 11A. In this way, as also shown in FIG. 11A, the covers 14 and 116a can be used together as a mini-packaging device for the disc shaped media 42. In the embodiment shown, the inner wall 116c helps to securely retain the disc shaped media against movement. However, it is understood that the benefits of the invention could be achieved without such inner wall, or utilizing one of the other retaining methods disclosed herein.

Figure 12:
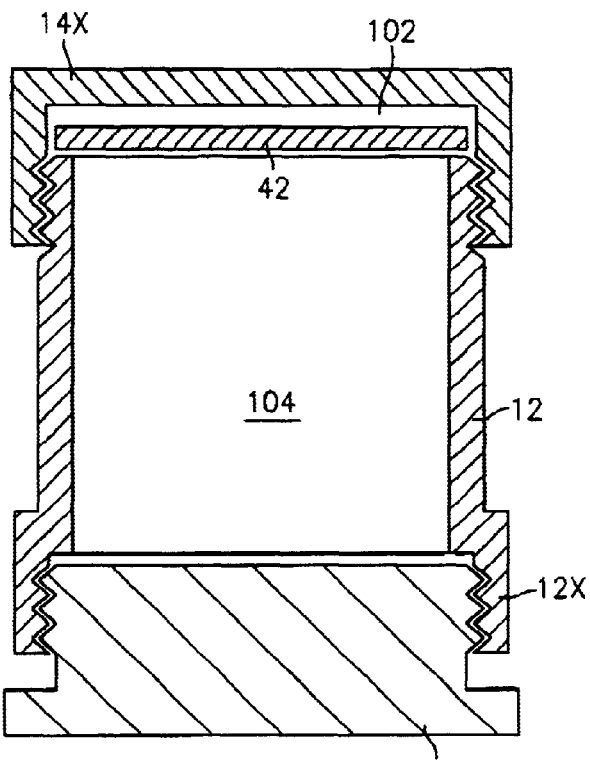
FIG. 12 is a cut-away, cross-sectional side view of an alternative embodiment of the device shown in FIGS. 11 and 11A in which the method shown in FIG. 3B for retaining the disc media is utilized and in which the two covers threadably engage the base and, when removed, can be threaded together to create a mini-packaging unit.

In the alternative embodiment shown in FIG. 12, the disc shaped media seats on the rim 28 as in the embodiment shown in FIG. 3B, but the cover 14x does not snap onto the base 12, but rather, threadably engages it. Furthermore, the bottom 12x of the base 12 is flared outwardly and contains internal threads that are of the same dimension as the internal threads of the cover 14x. The cover 116x includes mating external threads such that the cover 116x can be threaded into the flared bottom 12x of base 12. In this way, the covers 14x and 116x can be removed from the base 12 and threadably engaged to form a mini-packaging unit for the disc shaped media.

Figure 12A:
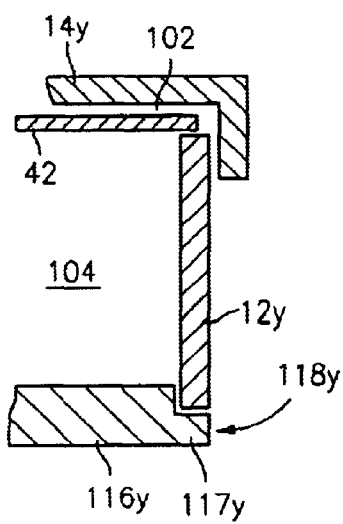
FIGS. 12A and 12B are cut-away, cross-sectional side views of alternative embodiments of the device shown in FIG. 12, wherein the two covers slidably engage after removal (FIG. 12A) or threadably engage after removal (FIG. 12B)
Figure 12B:
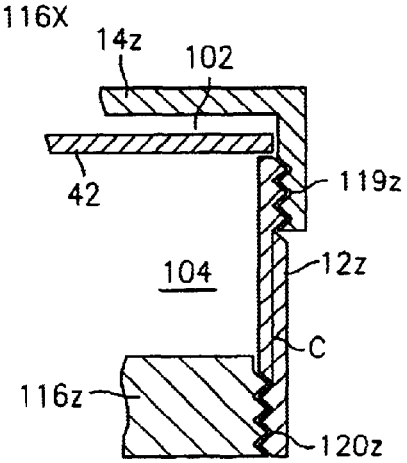

In the alternative embodiments of FIGS. 12A and 12B, the need to flare out the bottom of the base 12 is eliminated. In FIG. 12A, the base 12y receives a bottom cover 116y that includes an overlapping portion 117y, the outer surface 118y of which is of equal dimension to the outer surface 118y of which is of equal dimension to the outer wall of the base 12y, such that covers 14y and 11y can be slidably engaged to form a mini-storage unit for the disc media. In FIG. 12B, the base 12z has an external threaded portion 119z and an internal threaded portion 120z each of which extends beyond the center line "C" of the wall of the base 12z. In this way, when the covers 14z and 116z are removed, they can be threadably engaged to form a mini-storage unit for the disc media.

Figure 13:
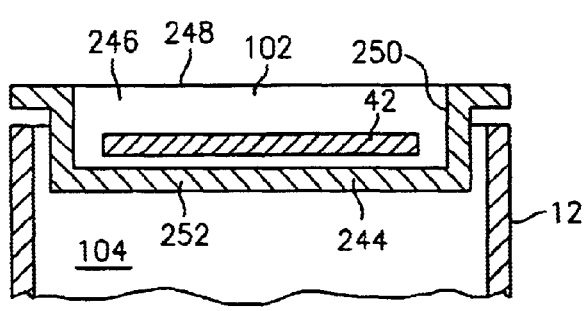
FIG. 13 is a cut-away, cross-sectional side view of another embodiment of the present invention in which a concave cavity on the exterior side of the cover for the device forms the first chamber for the disc media and a seal encloses the disc media within the concave cavity.

FIG. 13 shows a further alternative embodiment, wherein the cover 244 nestingly seats within the base 12 and the disc shaped media 42 is placed within the concave recess 246 of the cover 244. A seal 248 made of plastic or other suitable material is applied to the cover 244 to hold the disc shaped media within the cover 244 until the seal is removed by the user. The disc shaped media can be retained against movement within the cover 244 as a result of contact with the side walls 250, bottom wall 252 and seal 248, or by utilization of any of the other methods taught herein.

FIG. 14 shows a further alternative embodiment wherein the base 12 is a separately manufactured container of miscellaneous content, that includes a slightly concave end 251, the depth 252 of which exceeds the combined thickness of a disc shaped media 42 and a protective element 50 which are seated within the concave end 251 and held there by cover 14 which snaps onto base 12. In an alternate embodiment, a protective element is not used or the disc shaped media is packaged in an envelope (not shown).

FIG. 15 shows a further alternative embodiment wherein the disc shaped media is mounted and sealed within cover 14, e.g., as taught herein in connection with other embodiments, and cover 14 is attached to base 12 by paper packaging material skin 01 that binds the cover 14 and base 12 together. Cover 14 is separated from base 12 by pulling string 302 which tears the skin 301 and brakes the circumferential attachment between cover 14 and base 12.

It would be understood that in each embodiment, a container device is provided in which disc shaped media can be packaged, distributed, displayed at retail and, if desired, restored with other materials and that, in effecting such usage, discrete chambers are provided for the disc media and for the other materials so as to prevent contact between the disc media and the other materials. In the embodiments shown in FIGS. 1 through 6B, the inner structure, whether it is the annular collar of FIG. 1, or the discretely positioned abutment/protrusion clips of FIG. 3, or the upstanding rim in FIG. 3B, or the lid and supplemental lid of FIG. 3C, or the "spider" structure of FIG. 4, or the "trap" structure of FIG. 5, in each case is located in and helps define a first chamber in the lower base component 12. Underneath this first chamber is a second chamber. The first chamber receives and securely holds, despite repeated removal and re-packaging, the disc shaped media. The second chamber receives the other materials and keeps these materials separate from the disc shaped media. The need for a separate "jewel case" for the disc shaped media is thus completely eliminated.

It would be understood that the shape of the container can be varied without departing from the scope of the present invention, e.g., the cylindrical base 12 can be square or rectangular so long as the outer wall of the collar 40 corresponds and the collar includes spacers from the outer wall of the collar to the annular ring and annular lip of the present invention. Similar adjustments could be made to the other embodiments as would be apparent to those skilled in the an having reviewed this disclosure. The abutment/ protrusions clips of FIG. 3 could be mounted on a non-cylindrical shaped base, as could the spider structure of FIG. 4 or the trap structure of FIG. 5.

It would be understood by those skilled in the art that the function of the annular ring of FIG. 1 or the abutments of FIG. 2 could be performed by an appropriately dimensioned inner wall 26 of the container 12.

It would be further understood that while several methods of attaching the annular collar of FIG. 1, the abutment/ protrusion clips of FIG. 2, the spider structure of FIG. 3 and the trap structure of FIG. 4 have been shown, those skilled in the alt after having reviewed this disclosure could devise other means of attachment without departing from the scope of the present invention.

It would be further understood by those skilled in the art that the device and method of this invention can accommodate one or more disc shaped media, e.g., through the insertion of protective elements therebetween.

Illustrated in FIGS. 16 through 18 is an additional embodiment of the present invention comprising a storage device 500 adapted to receive the disc-shaped media 42, and thereafter to be affixed to a rigid or semi-rigid planar member 502 that is either hingedly or removably attached to the remainder of the object, such as the cover of a book or folder, or the side or top of a box. The storage device 500 includes an upper portion 504, which upper portion provides the platform 506 upon which the disc-shaped media 42 is situated, and a lower portion 508, which lower portion 508 comprises an outwardly extending skirt 510. In the preferred embodiment, the upper portion 504 is cylindrical in shape, with the top of the cylinder being the platform 506, which platform is at least slightly larger in diameter than the diameter of the disc-shaped media 42. However, it should be appreciated that the upper portion 504 may be any shape or size, although preferably the platform 506 should be large enough in area such that the disc-shaped media 42 may be seated thereon without there being any overhang—that is, without any portion of the disc-shaped media 42 hanging over the edge of the platform 506 or otherwise not being in contact with the platform 506.

The upper portion 504 of the storage device 500 is inserted through an opening 512 in the planar member 502, which opening 512 is dimensioned in terms of size and shape relative to the size and shape of the upper portion 504 such that the sides 514 of the upper portion 504 may, in a preferred embodiment, come into contact with the sides of the opening 512. The storage device 500 is prevented from being completely inserted through the planar member 502 by means of the skirt 510, which skirt 510 engages the rear surface 516 of the planar member 502. The size and shape of the skirt 510 is irrelevant, provided of course that it is larger in area than the opening 512. However, in the preferred embodiment, the skirt 510 is substantially planar such that it sits flush against the rear surface 516, and provides a relatively smooth and even surface against which the pages of a book or the contents of a folder or portfolio may be placed.

A cover 518 is provided to frictionally engage and cover the upper portion 504 and thereby create a secure chamber 520 within which the disc-shaped media 42 may be stored. Such cover 518 and upper portion 504 cooperate to prevent the disc-shaped media from moving linearly either in the plane of or perpendicular to the plane of the disc-shaped media 42 while allowing it to rotate. Accordingly, the shape of the cover 518 is substantially the same as that of the upper portion 504 such that the cover 518 may be attached to and thereafter removed from the upper portion 504 by means of the frictional contact therebetween. The height of the cover 518 must be greater than the thickness of the disc-shaped media 42 so as to create the chamber 520 between the cover 518 and the platform 506 of the upper portion 504 and at least partially overlie the side 514 of upper portion 504. It would be obvious to those skilled in the art that other means of attaching exist, such as snaps, adhesives, clasps and the like In one embodiment, the height of the upper portion 504 is greater than the thickness of the planar member 502 such that the platform 506 rises above the planar member 502 and thereby creates a surface for the sides 514 to engage the cover 518.

In another embodiment, the platform 506 may in fact be below or co-planar with the upper surface of the planar member 502 such that the disc-shape media actually is nested within the planar member 502 beneath or level with the upper surface. Such embodiment is illustrated in FIG. 21 in which the storage device 500 is being attached to a box 522 by means of the insertion of the storage device 500 into a separate planar support member 524 having an opening 512 therein, which planar support member 524 is then attached to the box 522 by means of glue 526 or other attachment means. The outer diameter of the platform should be less than the inner diameter of the opening so as to allow the cover 518 to be nested between the outer surface 524 and the inner wall.

Positioning means 534 may be situated so as to align the planar member 502 and create enough space around the upper surface 504 for the cover 518 to fit in place. Such positioning means 534 may consist of mating elements such as pimples and depressions, tracks and recessions or other retaining means such as adhesives.

Illustrated in FIGS. 19 and 20 is an alternative embodiment of the present invention in which the upper portion 504 is replaced by a cylindrical support structure 528 adapted to be inserted through the central aperture 530 of the disc-shaped media 42. The support structure 528 allows the disc-shaped media 42 to rotate freely, while preventing the disc-shaped media from moving in the plane of the disc-shaped media 42. In order to prevent the disc-shaped media from sliding off the support structure 528, at least one protrusion 532 may be provided on the support structure 528, which protrusion 532 and support structure 528 are at least slightly flexible so as to allow said disc-shaped media 42 to be snapped over the protrusions 532 to thereby attach or remove the disc-shaped media from the support structure 528.

It can be observed from the illustration in FIG. 19 that using a cylindrical support structure 528 in place of the upper portion 504 of FIGS. 16 through 18 could result in the storage device shifting within the opening 512. One solution is to adhere the storage device 500 to the rear surface 516 of the planar member 502 by means of an adhesive. Alternatively, one or more positioning members 534 may be provided on the surface of the skirt 510, which positioning members 534 are situated based upon the shape of the opening 512. The positioning members 534 thereby cooperate to engage the sides of the opening 512 to thereby secure the storage device 500 in place within the opening 512.

In a further embodiment, a seal 536 may be provided over the planar member 502 and storage device 500, which seal is removed by means of a pull tab 538. Said seal 536 may be reusable so as to allow repeated attachment to the planar member 502 and storage device 500.

Having thus described the invention with particular reference to the preferred forms thereof, it will be obvious that various changes and modifications can be made therein without departing from the spirit and scope of the present invention as defined by the appended claims.

Wherefore we claim:

1. A device for packaging a storage media together with an object having at least one rigid or semi-rigid member, said member having a front surface and a back surface wherein said member is attached to the remainder of said object, said device comprising:

at least one disc-shaped media having a central aperture therethrough;

an opening provided through said rigid or semi-rigid member; and a storage platform having an upper portion and a lower portion, wherein said upper portion has a shape and size at a first point where said upper portion meets said lower portion which is complementary to said opening such that said upper portion may be inserted through said opening such that said lower portion at a second point where said lower portion meets said upper portion is in flush alignment with the back surface, said upper portion further including means for receiving and retaining said disc-shaped media, wherein said lower portion is larger in size at said second point than said upper portion such that said lower portion engages said back surface to thereby prevent said storage device from completely passing through said opening.

2. The device of claim 1, wherein said opening is circular and said upper portion is cylindrical in shape.

3. The device of claim 1, wherein said object is selected from the group consisting of a book, a folder, a portfolio and a box.

4. The device of claim 1, further including a cover adapted to engage said upper portion to thereby create a chamber within which said disc-shaped media may be secured.

5. A device for packaging a storage media together with an object having at least one rigid or semi-rigid member, said member having a front surface and a back surface wherein said member is attached to the remainder of said object, said device comprising:

at least one disc-shaped media having a central aperture therethrough;

an opening provided through said rigid or semi-rigid member;

a storage platform having an upper portion and a lower portion, wherein said upper portion has a shape and size at a first point where said upper portion meets said lower portion which is complementary to said opening such that said upper portion may be inserted through said opening such that said lower portion at a second point where said lower portion meets said upper portion is in flush alignment with the back surface, said upper portion further including means for receiving and retaining said disc-shaped media, wherein said lower portion is larger in size at said second point than said upper portion such that said lower portion engages said back surface to thereby prevent said storage device from completely passing through said opening; and a cover adapted to engage said upper portion to thereby create a chamber within which said disc-shaped media may be secured.

6. A device for packaging a storage media together with an object having at least one rigid or semi-rigid member, said member having a front surface and a back surface wherein said member is attached to the remainder of said object, said device comprising:

at least one disc-shaped media having a central aperture therethrough;

an opening provided through said rigid or semi-rigid member; and a storage platform having an upper portion and a lower portion, wherein said upper portion may be inserted through said opening and wherein said upper portion provides a platform upon which said disc-shaped media sits, said upper portion further including a cylindrical support structure disposed on said platform and adapted to receive said disc-shaped media through said central aperture, said support structure allowing said disc-shaped media to rotate freely, wherein said lower portion is larger in size than said upper portion such that said lower portion engages said back surface to thereby prevent said storage device from completely passing through said opening.

7. The packaging device of claim 6, wherein said support structure further includes at least one protrusion to retain said disc-shaped media upon said support structure, and wherein said support structure and said at least one protrusion are at least slightly flexible so as to allow said disc-shaped media to be snapped over said at least one protrusion and said support structure to thereby attach to and remove from said support structure.

8. The packaging device of claim 7, further including at least one positioning member disposed on said lower portion, said positioning member being adapted to retain said storage device in place within said opening.

9. The device of claim 8, further including a seal attached to said planar surface and said storage device.

10. A device for packaging a storage media together with an object having at least one rigid or semi-rigid member, said member having a front surface and a back surface wherein said member is attached to the remainder of said object, said device comprising:

at least one disc-shaped media having a central aperture therethrough;

an opening provided through said rigid or semi-rigid member;

a storage platform having an upper portion and a lower portion, wherein said upper portion may be inserted through said opening and wherein said upper portion provides a platform upon which said disc-shaped media sits, said upper portion further including a cylindrical support structure disposed on said platform and adapted to receive said disc-shaped media through said central aperture, said support structure allowing said disc-shaped media to rotate freely, wherein said support structure further includes at least one protrusion to retain said disc-shaped media upon said support structure, and wherein said support structure and said at least one protrusion are at least slightly flexible so as to allow said disc-shaped media to be snapped over said at least one protrusion and said support structure to thereby attach to and remove from said support structure, wherein said lower portion is larger in size than said upper portion such that said lower portion engages said back surface to thereby prevent said storage device from completely passing through said opening; and at least one positioning member disposed on said lower portion, said positioning member being adapted to retain said storage device in place within said opening.

11. A method for packaging a storage media together with an object having at least one rigid or semi-rigid planar member, said member being attached to the remainder of said object and having an opening extending entirely therethrough, said method comprising the steps of:

providing at least one disc-shaped media having a central aperture therethrough;

providing a storage platform having an upper portion and a lower portion, wherein said upper portion has a shape and size at a first point where said upper portion meets said lower portion which is complementary to said opening such that said upper portion may be inserted through said opening such that said lower portion at a second point where said lower portion meets said upper portion is in flush alignment with said back surface, said upper portion further including for receiving and retaining said disc-shaped media, wherein said lower portion is larger in size at said second point than said upper portion such that said lower portion engages said back surface to thereby prevent said storage device from completely passing through said opening;

said upper portion of said storage device through said opening;

positioning said disc-shaped media to means for receiving and retaining; removably attaching a cover to said upper portion.

* * * * *